US008050925B2

(12) United States Patent
Rahim et al.

(10) Patent No.: US 8,050,925 B2
(45) Date of Patent: *Nov. 1, 2011

(54) RECOGNIZING THE NUMERIC LANGUAGE IN NATURAL SPOKEN DIALOGUE

(75) Inventors: Mazin G. Rahim, Matawan, NJ (US); Giuseppe Riccardi, Hoboken, NJ (US); Jeremy Huntley Wright, Warren, NJ (US); Bruce Melvin Buntschuh, Berkeley Heights, NJ (US); Allen Louis Gorin, Berkeley Heights, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/612,871

(22) Filed: Nov. 5, 2009

(65) Prior Publication Data

US 2010/0049519 A1    Feb. 25, 2010

Related U.S. Application Data

(63) Continuation of application No. 11/276,502, filed on Mar. 2, 2006, now Pat. No. 7,624,015, which is a continuation of application No. 09/314,637, filed on May 19, 1999, now Pat. No. 7,181,399.

(51) Int. Cl.
*G10L 15/14* (2006.01)
*G10L 15/18* (2006.01)
(52) U.S. Cl. .................... 704/256.5; 704/257
(58) Field of Classification Search ............... 704/256.1, 704/256.5, 257
See application file for complete search history.

(56) References Cited

U.S. PATENT DOCUMENTS

| 4,914,704 A | 4/1990 | Cole et al. |
| 5,303,299 A | 4/1994 | Hunt et al. |
| 5,613,037 A | 3/1997 | Sukkar |
| 5,737,490 A | 4/1998 | Austin et al. |
| 5,937,384 A | 8/1999 | Huang et al. |
| 5,970,449 A | 10/1999 | Alleva et al. |
| 6,219,407 B1 | 4/2001 | Kanevsky et al. |
| 7,181,399 B1 | 2/2007 | Rahim et al. |
| 7,624,015 B1 * | 11/2009 | Rahim et al. ............... 704/256.5 |

FOREIGN PATENT DOCUMENTS

JP    2000020085    1/2000

OTHER PUBLICATIONS

NN9410297, Handling Names and Numerical Expressions in a n-gram language model, Oct. 1994, IBM Technical Disclosure Bulletin, vol. 37, pp. 297-298.

* cited by examiner

*Primary Examiner* — Angela A Armstrong

(57) ABSTRACT

A system and a method are provided. A speech recognition processor receives unconstrained input speech and outputs a string of words. The speech recognition processor is based on a numeric language that represents a subset of a vocabulary. The subset includes a set of words identified as being for interpreting and understanding number strings. A numeric understanding processor contains classes of rules for converting the string of words into a sequence of digits. The speech recognition processor utilizes an acoustic model database. A validation database stores a set of valid sequences of digits. A string validation processor outputs validity information based on a comparison of a sequence of digits output by the numeric understanding processor with valid sequences of digits in the validation database.

20 Claims, 2 Drawing Sheets

RECOGNIZING THE NUMERIC LANGUAGE IN NATURAL SPOKEN DIALOGUE

This application is a continuation of U.S. patent Ser. No. 11/276,502, filed Mar. 2, 2006, which is a continuation of U.S. patent application Ser. No. 09/314,637, filed May 19, 1999, now U.S. Pat. No. 7,181,399, the contents of which are incorporated herein by reference in their entirety.

BACKGROUND OF THE INVENTION

1. Field of the Invention

This invention relates to a system for numeric language recognition in natural spoken dialogue.

2. Description of the Related Art

Speech recognition is a process by which an unknown speech utterance (usually in the form of a digital PCM signal) is identified. Generally, speech recognition is performed by comparing the features of an unknown utterance to the features of known words or word strings. Hidden Markov models (HMMs) for automatic speech recognition (ASR) rely on high dimensional feature vectors to summarize the short-time, acoustic properties of speech. Though front-ends vary from speech recognizer to speech recognizer, the spectral information in each frame of speech is typically codified in a feature vector with thirty or more dimensions. In most systems, these vectors are conditionally modeled by mixtures of Gaussian probability density functions (PDFs).

Recognizing connected digits in a natural spoken dialog plays a vital role in many applications of speech recognition over the telephone. Digits are the basis for credit card and account number validation, phone dialing, menu navigation, etc.

Progress in connected digit recognition has been remarkable over the past decade. For databases recorded under carefully monitored laboratory conditions, speech recognizers have been able to achieve less than 0.3% word error rate. Dealing with telephone speech has added a new dimension to this problem. Variations in the spectral characteristics due to different channel conditions, speaker populations, background noise and transducer equipment cause a significant degradation in recognition performance. Previous practice has strictly focused on dealing with constrained input speech to produce digit sequences.

SUMMARY OF THE INVENTION

In accordance with the principles of the invention, the set of words or phrases that are relevant to the task of understanding and interpreting number strings is referred to as the "numeric language". The "numeric language" defines the set of words or phrases that play a key role in the understanding and automation of users' requests. According to an exemplary embodiment of the invention, the numeric language includes the set of word or phrase classes that are relevant to the task of understanding and interpreting number strings, such as credit card numbers, telephone numbers, zip codes, etc., and consists of six distinct phrase classes including "digits", "natural numbers", "alphabets", "restarts", "city/country name", and "miscellaneous".

In an exemplary embodiment of the invention, a system includes a speech recognition processor that receives unconstrained input speech and outputs a string of words. The speech recognition processor is based on a numeric language that represents a subset of a vocabulary. The subset includes a set of words identified as being for interpreting and understanding number strings. A numeric understanding processor contains classes of rules for converting the string of words into a sequence of digits. The speech recognition processor utilizes an acoustic model database. A validation database stores a set of valid sequences of digits. A string validation processor outputs validity information based on a comparison of a sequence of digits output by the numeric understanding processor with valid sequences of digits in the validation database.

Other aspects and advantages of the invention will become apparent from the following detailed description and accompanying drawing, illustrating by way of example the features of the invention.

DETAILED DESCRIPTION

Figure 1:
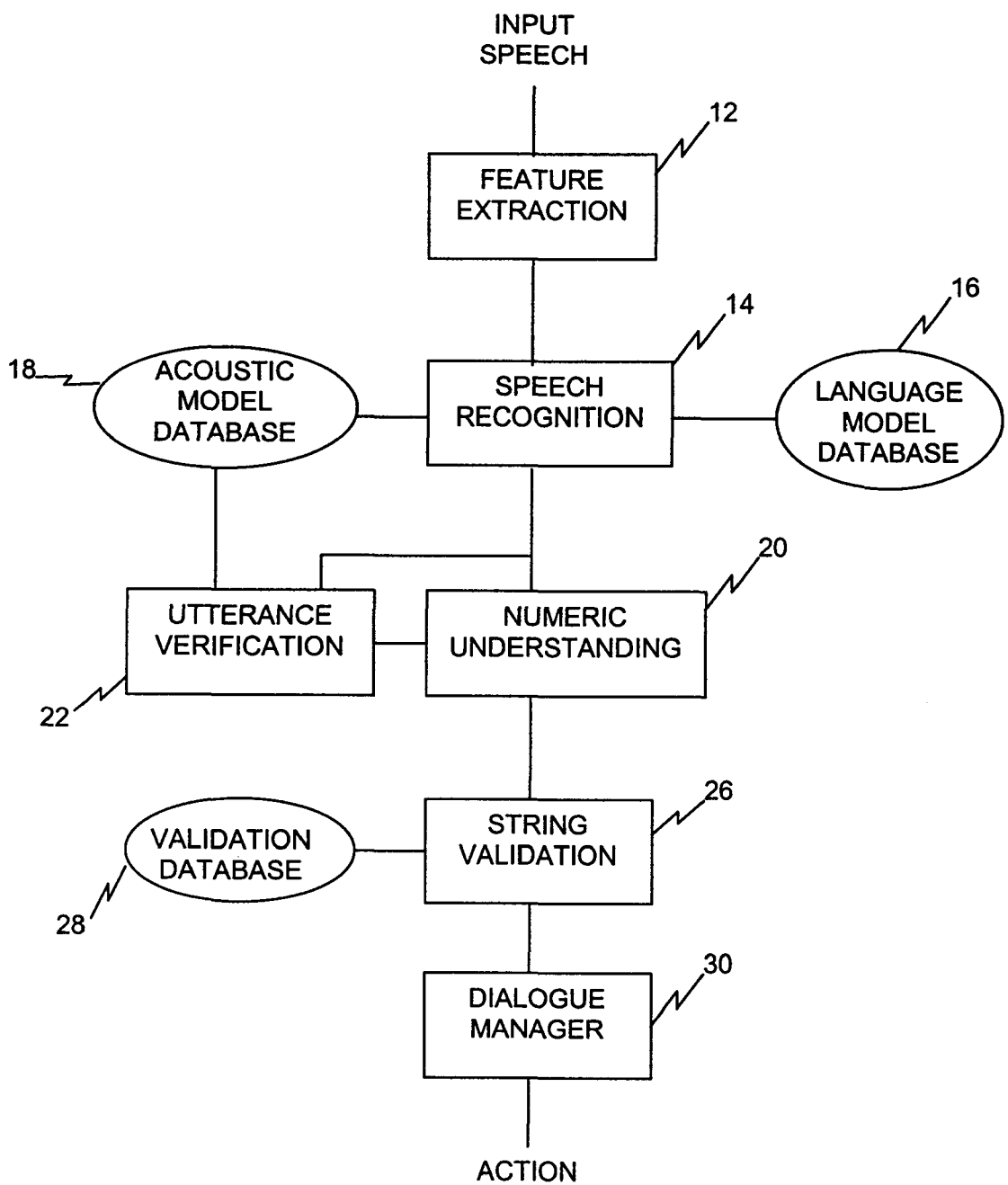
FIG. 1 illustrates a numeric language recognition system in accordance with the principles of the invention.

For a better understanding of the invention, together with other and further objects, advantages, and capabilities thereof, reference is made to the following disclosure and the figures of the drawing. For clarity of explanation, the illustrative embodiments of the present invention are presented as comprising individual functional blocks. The functions these blocks represent may be provided through the use of either shared or dedicated hardware, including, but not limited to, hardware capable of executing software. For example, the functions of the blocks presented in FIG. 1 may be provided by a single shared processor. Illustrative embodiments may comprise digital signal processor (DSP) hardware, read-only memory (ROM) for storing software performing the operations discussed below, and random-access memory (RAM) for storing DSP results. Very large scale integration (VLSI) hardware embodiments, as well as custom VLSI circuitry in combination with a general purpose DSP circuit, may also be provided. Use of DSPs is advantageous since the signals processed represent real physical signals, processes and activities, such as speech signals, room background noise, etc.

This invention is directed to advancing and improving numeric language recognition in the telecommunications environment, particularly the task of recognizing numeric words when embedded in natural spoken dialog. In particular, the invention is directed toward the task of recognizing and understanding users' responses when prompted to respond with information needed by an application involving the numeric language, such as, for example, their credit card or telephone number. We have identified those words that are relevant to the task and enhance the performance of the system to recognize those relevant words.

By way of example, and not limitation, in a specific embodiment of the invention, the numeric language forms the basis for recognizing and understanding a credit card and a telephone number in fluent and unconstrained spoken input. Our previous experiments have shown that considering the problem of recognizing digits in a spoken dialogue as a large-vocabulary continuous speech recognition task, as opposed to the conventional detection methods, can lead to improved system performance.

In an exemplary system for recognizing the numeric language in a natural spoken dialogue, illustrated in FIG. 1, a feature extraction processor 12 receives input speech. A speech recognition processor 14 is coupled to the feature extraction processor 12. A language model database 16 is coupled to the speech recognition processor 14. An acoustic model database 18 is coupled to the speech recognition processor 14.

A numeric understanding processor 20 is coupled to the speech recognition processor 14. An utterance verification processor 22 is coupled to the speech recognition processor 14. The utterance verification processor 22 is coupled to the numeric understanding processor 20. The utterance verification processor 22 is coupled to the acoustic model database 18.

A string validation processor 26 is coupled to the numeric understanding processor 20. A database 28 for use by the string validation processor 26 is coupled to the string validation processor 26.

A dialog manager processor 30 is coupled to the string validation processor 26. The dialogue manager processor 30 initiates action according to the invention in response to the results of the string validation performed by the string validation processor 26.

Using a spoken dialogue system imposes a new set of challenges in recognizing digits, particularly when dealing with naive users of the technology. In this example, during a spoken dialogue users are prompted with various open questions such as, "What number would you like to call?", "May I have your card number please?", etc. The difficulty in automatically recognizing responses to such open questions is not only to deal with fluent and unconstrained speech, but also to be able to accurately recognize an entire string of numerics (i.e., digits or words identifying digits) and/or alphabets. In addition the system ought to demonstrate robustness towards out-of-vocabulary words, hesitation, false-starts and various other acoustic and language variabilities.

Performance of the system was examined in a number of field trial studies with customers responding to the open-ended prompt "How may I help you?" with the goal to provide an automated operator service. The purpose of this service is to recognize and understand customers' requests whether it relates to billing, credit, call automation, etc.

In an important part of the field trials, customers were prompted to say a credit card number or a telephone number to obtain call automation or billing credit. Various types of prompts were studied with the objective to stimulate maximally consistent and informative responses from large populations of naive users. These prompts are engineered towards asking users to say or repeat their credit card or telephone number without imposing rigid format constraints.

The system is optimized to recognize and understand words in the dialogue that are salient to the task. Salient phrases are essential for interpreting fluent speech. They are commonly identified by exploiting the mapping from unconstrained input to machine action.

Those salient phrases that are relevant to the task are referred to as "numerics." Numeric words and phrases in the numeric language are the set of words that play a key role in the understanding and automation of customers' requests. In this example, the numeric language consists of six distinct phrase classes including digits, natural numbers, alphabets, restarts, city/country name, and miscellaneous.

Digits, natural numbers and alphabets are the basic building blocks of telephone and credit card numbers. Users may say "my card number is one three hundred fifty five A four . . . ". Restarts include the set of phrases that are indicative of false-starts, corrections and hesitation. For example, "my telephone number is nine zero eight I'm sorry nine seven eight. City/country names can be essential in reconstructing a telephone number when area codes are missing. For example, "I would like to call Italy and the number is three five . . . ". Finally, there are a number of miscellaneous phrases that can alter the sequencing of the numbers. Such phrases are "area-code", "extension number", "expiration date", etc. For our application, the numeric language consisted of a total of one hundred phrases.

According to the invention, numeric recognition in spoken dialogue systems is treated as a large vocabulary continuous speech recognition task where numerics are treated as a small subset of the active vocabulary in the lexicon. The main components of the numeric recognition system illustrated in FIG. 1 are described as follows.

In the feature extraction processor 10, the input signal, sampled at eight kHz, is first pre-emphasized and grouped into frames of thirty msec durations at every interval of ten msec. Each frame is Hamming windowed, Fourier transformed and then passed through a set of twenty-two triangular band-pass filters. Twelve mel cepstral coefficients are computed by applying the inverse discrete cosine transform on the log magnitude spectrum. To reduce channel variation while still maintaining real-time performance, each cepstral vector is normalized using cepstral mean subtraction with an operating look-ahead delay of thirty speech frames. To capture temporal information in the signal, each normalized cepstral vector along with its frame log energy are augmented with their first and second order time derivatives. The energy coefficient, normalized at the operating look-ahead delay, is also applied for end-pointing the speech signal.

Figure 2:
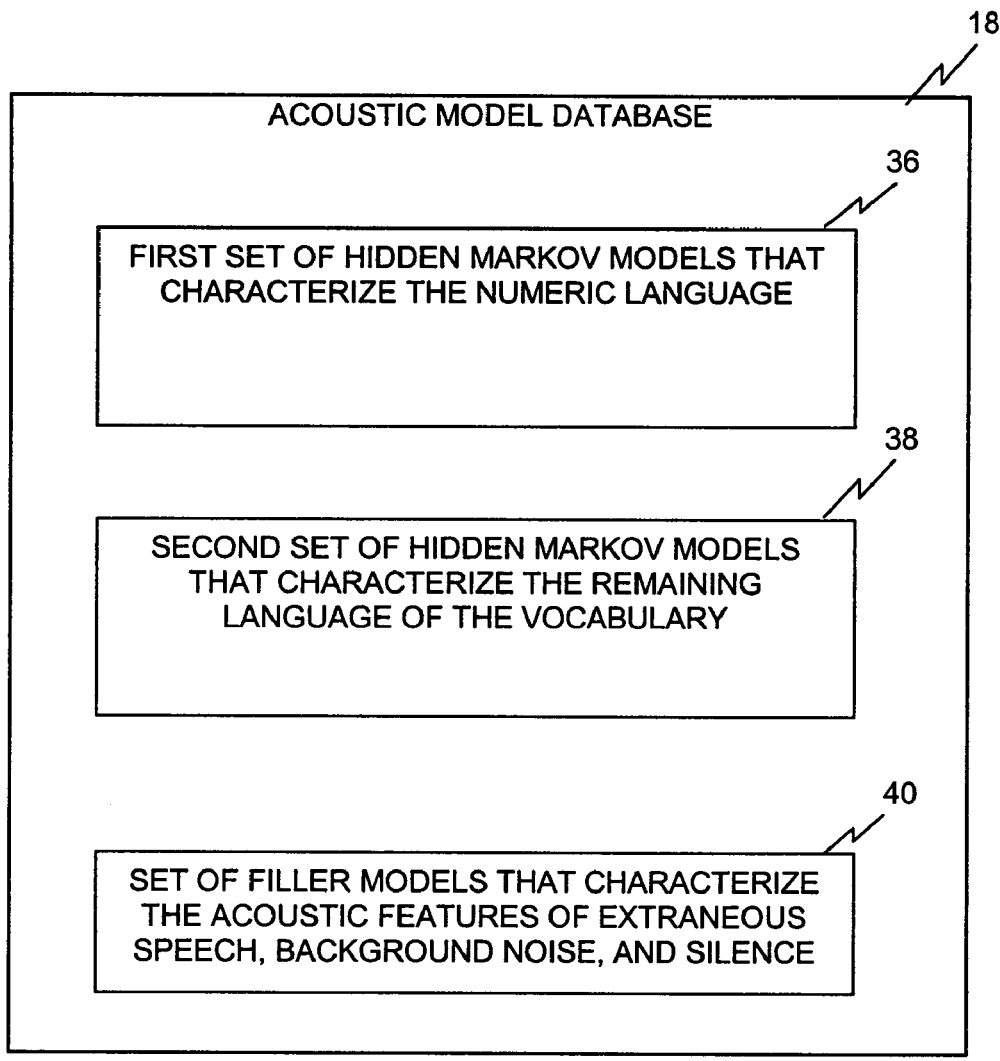
FIG. 2 illustrates an acoustic model database in accordance with the principles of the invention.

Accurate numeric recognition in fluent and unconstrained speech clearly demands detailed acoustic modeling of the numeric language (the numeric words and phrases). It is essential to accurately model out-of-vocabulary words (the non-numerics) as they constitute over eleven percent of the database. Accordingly, our design strategy for the acoustic model 18 has been to use two sets of subword units. Referring to FIG. 2, a first set 36 of hidden Markov models (HMMs) that characterize the acoustic features of numeric words is dedicated for the numeric language. A second set 38 of HMMs that characterize the acoustic features of the remaining vocabulary words is dedicated for the remaining vocabulary words. Each set 36, 38 applies left-to-right continuous density hidden Markov models (HMMs) with no skip states.

In the first set 36 dedicated for recognition of numerics, context-dependent acoustic units have been used which captured all possible inter-numeric coarticulation. The basic structure is that each word is modeled by three segments'; a head, a body and a tail. A word generally has one body, which has relatively stable acoustic characteristics, and multiple heads and tails depending on the preceding and following context. Thus, junctures between numerics are explicitly modeled. Since this results in a huge number of subword units, and due to the limited amount of training data, the head-body-tail design was strictly applied for the eleven digits (i.e., "one", "two", "three", "four", "five", "six", "seven", "eight", "nine", "zero", and "oh"). This generated two hundred seventy-four units which were assigned a three-four-three state topology corresponding to the head-body-tail units, respectively.

The second set 38 of units includes forty tri-state context-independent subwords that are used for modeling the non-numeric words, which are the remaining words in the vocabulary. Therefore, in contrast to traditional methods for digit recognition, out-of-vocabulary words are explicitly modeled by a dedicated set of subword units, rather than being treated as filler phrases.

To model transitional events between numerics, non-numerics and background/silence, an additional set 40 of units is used. Three filler models with different state topologies are also used to accommodate for extraneous speech and background noise events. In total, three hundred thirty-three units are employed in the exemplary units. Each state includes thirty-two Gaussian components with the exception of the background/silence model which includes sixty-four Gaussian components. A unit duration model, approximated by a gamma distribution, is also used to increment the log likelihood scores.

The language model database 16 is used by the speech recognition processor 14 to improve recognition performance. The language model database 16 contains data that describes the structure and sequence of words and phrases in a particular language. In this specific example, the data stored in the language model database 16 might indicate that a number is likely to follow the phrase "area code" or that the word "code" is likely to follow the word "area"; or, more generally, the data can indicate that in the English language, adjectives precede nouns, or in the French language, adjectives follow nouns. While language modeling is known, the combination of the language model database 16 with the other components of the system illustrated in FIG. 1 is not known.

Speech, or language, understanding is an essential component in the design of spoken dialogue systems. The numeric understanding processor 20 provides a link between the speech recognition processor 14 and the dialogue manager processor 30 and is responsible for converting the recognition output into a meaningful query.

The numeric understanding processor 20 translates the output of the recognizer 14 into a "valid" string of digits. However, in the event of an ambiguous request or poor recognition performance, the numeric understanding processor 20 can provide several hypotheses to the dialogue manager processor 30 for repair, disambiguation, or perhaps clarification.

A rule-based strategy for numeric understanding is implemented in the numeric understanding processor 20 to translate recognition results (e.g., N-best hypotheses) into a simplified finite state machine of digits only. Several classes of these rules which aim to translate input text into a digit sequence are presented in TABLE 1.

TABLE 1

| Rule | Definition | Example |
| --- | --- | --- |
| Naturals | translating natural numbers | one eight hundred and two → 1 8 0 0 2 |
| Restarts | correcting input text | nine zero eight sorry nine one eight → 9 1 8 |
| Alphabets | translating characters | A Y one two three → 2 9 1 2 3 |
| City/Country | translating city/country area codes | calling London, England → 4 4 1 8 8 |
| Numeric Phrases | realigning digits | nine on two area code nine zero one 9 0 1 9 1 2 |
| Out-of vocabulary | filtering | what is the code for Florham Park → 9 7 3 |

The utterance verification processor 22 identifies out-of-vocabulary utterances and utterances that are poorly recognized. The utterance verification processor 22 provides the dialogue manager 30 with a verification measure of confidence that may be used for call confirmation, repair or disambiguation. The output of the utterance verification processor 22 can be used by the numeric understanding processor 20.

Information is validated before being sent to the dialogue manager processor 30. Due to ambiguous speech inputs and possible errors in the dialogue flow, sometimes customers' responses to prompts represent invalid telephone number or credit card numbers. Sometimes, even with a robust system, misrecognition occurs.

In order to alleviate this problem, and to improve system performance generally, task-specific knowledge is introduced. The task-specific knowledge can be in the form of grammars that correspond to national and international telephone numbers and/or various credit card numbers, for example.

In the exemplary system illustrated in FIG. 1, a set of valid credit card numbers and a set of valid telephone numbers are stored in the validation database 28 for use by the string validation processor 26. The string validation processor checks the validation database 28 to determine whether the sequence of digits output by the numeric understanding processor 20 corresponds to an existing telephone number or credit card number.

In the specific example illustrated in FIG. 1, the string validation processor 26 outputs validity information that indicates the validity of the sequence of digits produced by the numeric understanding processor 20. The validity information indicates a valid, partially valid, or invalid sequence of numbers.

Checking whether the sequence of digits at the output of the numeric understanding processor 20 corresponds to an existing telephone or credit card number is valuable information in two respects. First, it provides a type of rejection which may be used to narrow down the error rate. Second, it guarantees that a valid credit card or telephone number is being processed.

The validity information and the sequence of digits output from the numeric understanding processor 20 are passed to the dialogue manager processor 30. The dialogue manager processor 30 initiates one or more actions based on the sequence of digits and the validity information.

A characterization of the problem of recognizing digits embedded in a spoken dialog has been presented herein. The invention is useful in recognizing credit card numbers, telephone numbers, zip codes, dates, times, etc. It will be appreciated that the principles of the invention are also applicable to pattern recognition generally.

While several particular forms of the invention have been illustrated and described, it will also be apparent that various modifications can be made without departing from the spirit and scope of the invention.

What is claimed is:

1. A method of processing speech, the method comprising:
receiving speech and generating a string of words based on the speech and based at least in part on a numeric language including a set of words for recognizing and processing number strings;
converting the string of words into a sequence of digits using classes of rules and according to an acoustic model database in which Markov models characterize acoustic features of numeric words and each word is modeled by three segments comprising a head, a body and a tail, and wherein the three segment structure only applies to single digit words;
storing a set of valid sequences of digits; and
generating validity information based on a comparison of the sequence of digits with a valid sequences of digits of the stored set of valid sequences of digits.

2. The method of claim 1, wherein the valid sequences of digits comprise valid telephone numbers.

3. The method of claim 1, wherein the valid sequences of digits comprise valid credit card numbers.

4. The method of claim 1, wherein the valid sequences of digits comprise valid social security numbers.

5. The method of claim 1, further comprising:
identifying out-of-vocabulary utterances and utterances that are poorly recognized.

6. The method of claim 1, further comprising:
initiating an action based on the validity information.

7. The method of claim 1, further comprising:
storing data describing a structure and a sequence of words and phrases.

8. The method of claim 1, wherein the classes of rules include a restarts rule.

9. A tangible computer-readable medium storing instructions for controlling a computing device to process speech, the instructions causing the computing device to perform steps comprising:
receiving speech and generating a string of words based on the speech and based at least in part on a numeric language including a set of words for recognizing and processing number strings;
converting the string of words into a sequence of digits using classes of rules and according to an acoustic model database in which Markov models characterize acoustic features of numeric words and each word is modeled by three segments comprising a head, a body and a tail, and wherein the three segment structure only applies to single digit words;
storing a set of valid sequences of digits; and
generating validity information based on a comparison of the sequence of digits with a valid sequences of digits of the stored set of valid sequences of digits.

10. The tangible computer-readable medium of claim 9, wherein the valid sequences of digits comprise valid telephone numbers.

11. The tangible computer-readable medium of claim 9, wherein the valid sequences of digits comprise valid credit card numbers.

12. The tangible computer-readable medium of claim 9, wherein the valid sequences of digits comprise valid social security numbers.

13. The tangible computer-readable medium of claim 9, the instructions further comprising:
identifying out-of-vocabulary utterances and utterances that are poorly recognized.

14. The tangible computer-readable medium of claim 9, the instructions further comprising:
initiating an action based on the validity information.

15. The tangible computer-readable medium of claim 9, the instructions further comprising:
storing data describing a structure and a sequence of words and phrases.

16. The tangible computer-readable medium of claim 9, wherein the classes of rules include a restarts rule.

17. A system for processing speech, the system comprising:
a processor;
a module that controls the processor to generate a string of words based on received speech and based at least in part on a numeric language including a set of words for recognizing and processing number strings;
a module that controls the processor to convert the string of words into a sequence of digits using classes of rules and according to an acoustic model database in which Markov models characterize acoustic features of numeric words and each word is modeled by three segments comprising a head, a body and a tail, and wherein the three segment structure only applies to single digit words;
a module that controls the processor to store a set of valid sequences of digits; and
a module that controls the processor to generate validity information based on a comparison of the sequence of digits with a valid sequences of digits of the stored set of valid sequences of digits.

18. The system of claim 17, wherein the valid sequences of digits comprise valid telephone numbers, credit card numbers and social security numbers.

19. The system of claim 17, further comprising:
a module that controls the processor to initiate an action based on the validity information.

20. The system of claim 17, further comprising:
a module that controls the processor to store data describing a structure and a sequence of words and phrases.

* * * * *